United States Patent [19]

Fischer et al.

[11] 4,114,507

[45] Sep. 19, 1978

[54] DRILL SCREW

[75] Inventors: Donald A. Fischer, Strongsville; Edwin M. Lipowski, North Olmsted; William E. Kalt, Bay Village, all of Ohio

[73] Assignee: The Kalt Manufacturing Company, North Ridgeville, Ohio

[21] Appl. No.: 742,631

[22] Filed: Nov. 17, 1976

[51] Int. Cl.$^2$ .............................................. F16B 25/00
[52] U.S. Cl. ..................................... 85/41; 10/10 R; 408/228
[58] Field of Search ..................... 85/41, 47; 10/10 R; 408/226, 228, 227, 230

[56] References Cited

U.S. PATENT DOCUMENTS

| 3,241,426 | 3/1966 | Gutshall | 85/47 |
|---|---|---|---|
| 3,395,603 | 8/1968 | Skierski | 85/47 |
| 3,463,045 | 8/1969 | Prescott | 85/41 |
| 3,682,038 | 8/1972 | Lejdegard | 85/41 |

Primary Examiner—Ramon S. Britts
Attorney, Agent, or Firm—Watts, Hoffmann, Fisher & Heinke Co.

[57] ABSTRACT

A drill and thread forming threaded fastener having a roll threaded shank constructed at one end for selective engagement with a driving tool, a forged drill point at the other end of the shank comprising a generally cylindrical section adjacent to said threaded shank and terminating in a generally paraboloidal tip section, a pair of diametrically opposed flutes occupying substantially entire diametrically opposed quadrants and having longitudinally extending generally planar surfaces located substantially in a diametric plane containing the axis of the fastener, the radially outer margins of which form cutting edges. The flutes form diametrically opposed quadrants the surfaces of which for the generally cylindrical section of the drill point are partial sectors or approximately one-half segments of cylinders having axes offset from the aforesaid diametric plane containing the axis of the fastener in the direction towards the other partial sector to provide clearance for the cutting edges along the generally cylindrical section of the drill point. In the generally paraboloidal section of the drill point, the flutes form partial sectors of paraboloids, the axes of which coincide with the axes of the aforesaid cylinders which form the radially outer surfaces of the generally cylindrical section and the bases of which coincide with the ends of the aforementioned cylinders adjacent thereto, thus providing clearance for the cutting edges along the generally paraboloidal section of the drill point.

2 Claims, 12 Drawing Figures

DRILL SCREW

Method blank and dies for manufacturing a drill and thread forming fastener of the character referred including a forged drill point.

BACKGROUND OF THE INVENTION

1. Field of the Invention

The invention relates to threaded fasteners having a drill point capable of drilling a hole for the subsequent formation of threads therein by the threads of the fastener during driving of the fastener and to dies for producing the drill point.

2. Description of the Prior Art

Threaded fasteners capable of drilling a hole and forming threads therein during driving of the fastener are known. Prior fasteners of this type however are relatively difficult to drive, the tip ends of the drill point are relatively weak and/or the cutting edges have inadequate clearance all because the drill point lacks optimum configuration.

SUMMARY OF THE INVENTION

The present invention provides a novel and improved self-drilling and thread forming threaded fastener including a strong, forged drill point at one end so constructed that the fastener has a relatively highly efficient drilling action and can be driven with relatively low torque into various materials.

The invention also provides a novel method together with novel dies and blank for the inexpensive production of threaded fasteners of the character referred to.

More specifically, the invention provides a self-drilling and thread forming threaded fastener of the character mentioned including a forged drill point at one end of a threaded shank. The tip or drill end has a general configuration of two diametrically opposed sections of paraboloids one radially outer axial edge of each of which is substantially in the same diametrical plane containing the axis of the fastener and constitute cutting edges and which paraboloids have their axes offset from the aforesaid diametric plane containing the axis of the fastener such as to provide clearance for the cutting edges, and to a method and dies for producing the fastener.

DESCRIPTION OF THE PREFERRED EMBODIMENTS

Figure 1:
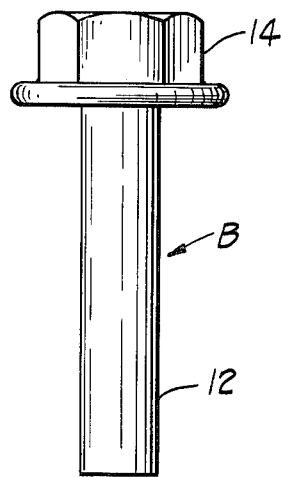
FIG. 1 is an elevational view of a suitable blank for use in making the drilling and thread forming threaded fastener shown in FIG. 3.
Figure 2:
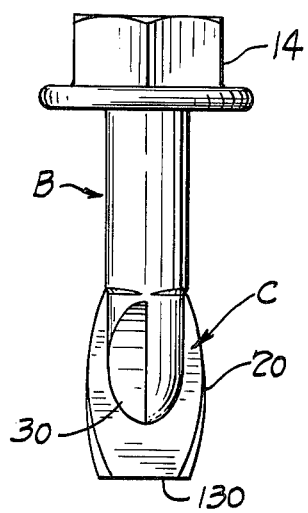
FIG. 2 is an elevational view of the blank of FIG. 1 after performance of the point forging operation thereon in accordance with the preferred embodiment of the invention.
Figure 3:
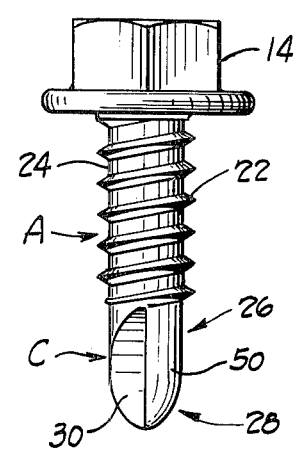
FIG. 3 is an elevational view of a drilling and thread forming threaded fastener of the present invention.

The threaded fastener A shown in FIG. 3 of the drawings is produced from the blank B which comprises a cylindrical shank 12 having a flanged hexagonal head 14 at its upper end for connection of the threaded fastener A produced therefrom to a driving tool. Other head configurations may be substituted for the hexagonal head shown provided they include constructions suitable for connection to a driving tool, preferably a power actuated driving tool. In the production of the finished fastener A shown in FIG. 3 the blank B is first subjected to a dieing operation to forge an end thereon designated generally by the reference character C in FIG. 2 having flash 20 thereabout. The end C ultimately becomes the drill point C of the fastener A.

Subsequent to the dieing operation a thread 22 is rolled on the shank of the blank B on conventional thread rolling equipment. The flash 20 is broken away from the drill point C of the blank B during the thread rolling operation. The thread 22 is preferably of standard form although other forms of threads may be employed. The diameter of the shank 12 of the blank B is, as is understood in the art, slightly greater than the root diameter of the thread 22 on what is now designated as the shank 24 of the fastener A and approximately equal to the pitch diameter of the thread. The diameter of the shank 12 is also slightly smaller than the maximum diameter of the thread 22.

The drill point C comprises two aligned sections, i.e. a generally cylindrical section 26 at the end of the shank of the fastener A opposite to the head 14 and a generally paraboloidal tip or drill end section 28 at the end of the generally cylindrical section 26. The generally cylindrical secion is hereinafter sometimes referred to as the reaming section 26 of the drill point C. The drill point has two diametrically opposed sector-like duplicate flutes or slots 30, 32 in diametrically opposed quadrants. The slots 30, 32 extend lengthwise of the axis of the shank of the fastener, which axis is designated by the reference character $a$ in FIG. 7. The flutes 30, 32 have radially disposed sides 34, 36, respectively, which lie generally in a diametric plane $b$ containing the axis $a$ of the shank of the fastener, see FIG. 7. The intersections of the radial surfaces or sides 34, 36 of the flutes 30, 32 with the arcuate surfaces of the drill point C form cutting edges 40, 42, respectively, extending lengthwise of the axis of the shank of the fastener. The other side 44, 46 of the flutes 30, 32, respectively, are arcuate in shape and are generally at right angles to the sides 34, 36, respectively. The portions of the sides 44, 46 in the section 28 of the drill point are in or substantially in a diametrical plane $c$ that contains the axis of the fastener and, generally, is normal to the plane $b$ and undercut the plane c a small amount, as indicated at 48. The terminal parts of the sides 44, 46 adjacent to the extreme end 49 of the drill point are in the diametrical plane c.

Figure 7:
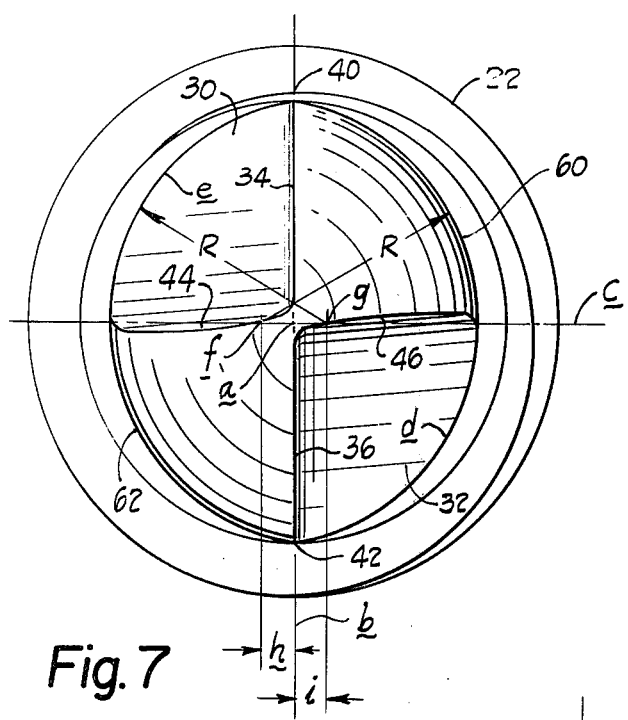
FIG. 7 is an end view of the drill end of the fastener shown in FIG. 3 as viewed from the line 7—7 of FIG. 4.
Figure 8:
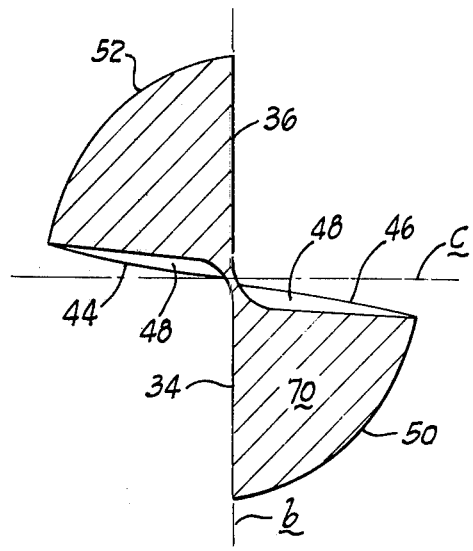
FIG. 8 is a sectional view approximately on the line 8—8 of FIG. 4.
Figure 9:
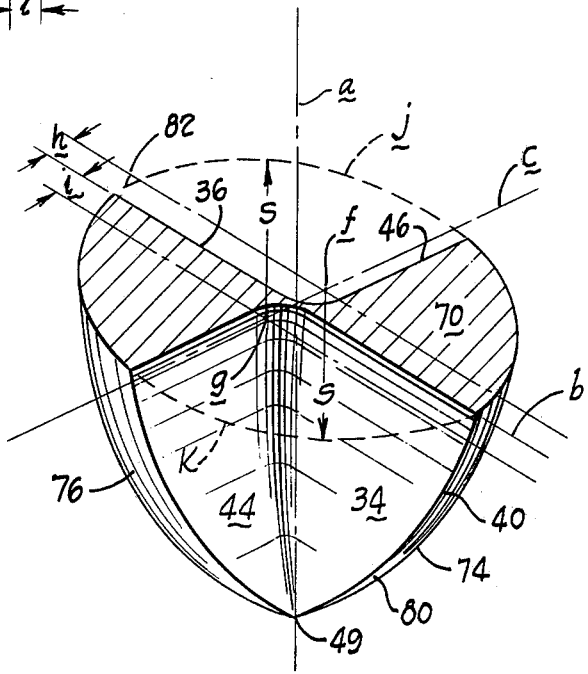
FIG. 9 is a prospective view of the tip end of the fastener shown in FIG. 3 in section approximately on the line 9—9 of FIG. 6.

The flutes or slots 30, 32 extend from a point adjacent to the thread 22 to the end 49 of the drill point and divide the drill point into two duplicate quadrants 50, 52. The portions 54, 56 of the quadrants 50, 52 in the generally cylindrical section 26 of the drill point are partial sectors or half segments of like cylinders $d$, $e$ of radii R. The axes $f$, $g$ of the cylinders $d$, $e$ are offset along the plane $c$ as indicated in FIG. 7 distances $h$, $i$ transversely of the plane $b$ such that the distances of the outer radial surfaces 60, 62 of the cylinders, and in turn the parts 54, 56 of the quadrants 50, 52, respectively, from the axis $a$ of the fastener decrease from their intersections with the surfaces or sides 34, 36 of the flutes 30, 32, which intersections form the generally linear parts 64, 66 of the cutting edges 40, 42, towards the sides 46, 44 of the trailing flutes 32, 30, respectively, referring to the direction D in which the screw is rotated during driving to provide clearance for the parts 64, 66 of the cutting edges 40, 42, respectively.

The parts or portions of the flutes 30, 32 in the generally paraboloidal section 28 of the drill point C divide or form the section 28 into two diametrically opposed sectors 70, 72 of paraboloids $j$, $k$, the axes of which coincide with the axes $f$, $g$ of the cylinders $d$, $e$, respectively. As previously noted the surfaces 60, 62 of the generally cylindrical section 26 of the drill point C lie in or are a part of the surfaces of cylinders $d$, $e$. The ordinates S at the bases of the paraboloids are equal to the radii of the cylinders $d$, $e$. The distances of the exterior curved surfaces 74, 76 of the section 28 of the drill point from the axis $a$ decrease, because of the offset of the axes $f$, $g$ in the manner previously discussed, in the direction from the cutting portions 80, 82 of the cutting edges 40, 42 which lie in or form a part of the section 28 of the drill point, toward the sides 46, 44 of the trailing flutes, referring to the direction of rotation of the fastener during driving, to provide clearance for the cutting edge portions 80, 82 in the section 28 in a manner similar to that in which the surfaces 60, 62 of the generally cylindrical section 26 of the drill point provide clearance for the cutting edges in the section 26 of the drill point, previously discussed. The cutting edges 40, 42 are continuous and the cutting edge portions 80, 82 on the section 28 of the drill point are continuations of the cutting edge portions 64, 66 of the generally cylindrical section 26 of the drill point. The abscissas, not indicated in the drawings, of the paraboloids $j$, $k$ are imperial and determine the bluntness or sharpness of the end of the drill point. Optimum abscissas can be selected for fasteners of various size and/or designed for use with materials of different hardness.

As previously suggested, the section lines 8—8 and 9—9 occur at the junction of the generally cylindrical section 26 of the drill point C with the generally paraboloidal section 28 of the drill point. The end of the section 26 of the drill point opposite the section 28 converges or merges into the trailing threaded shank 24 of the fastener A. In the fastener A the thread 22 is shown terminating at or adjacent the end of the drill point nearest the head 14 but it is to be understood that the thread may be continued at least a short distance over the drill point as desired. In either event, the end of the thread 22 at the drill point is formed with a progressively decreasing in height and fades into the shank of the fastener as illustrated in the drawings, see particularly FIG. 4.

Figure 4:
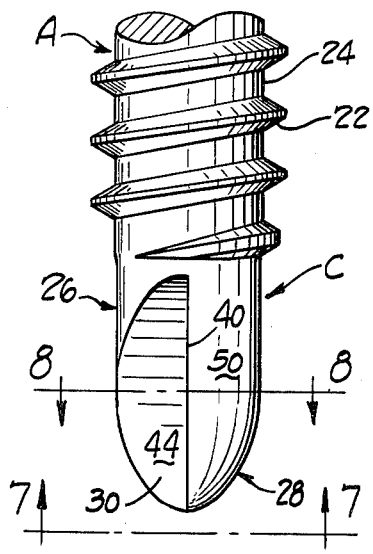
FIG. 4 is an enlarged view of the drill end of the of the fastener shown in FIG. 3.
Figure 5:
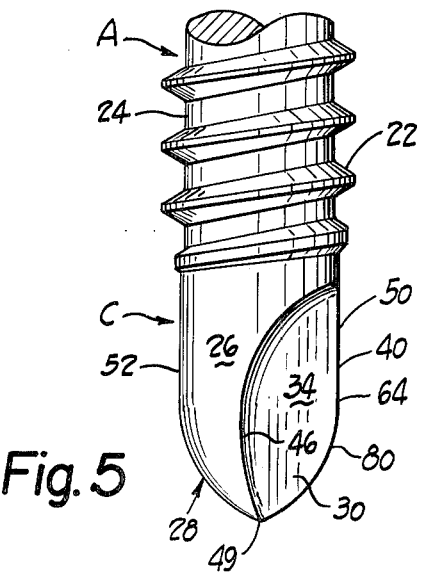
FIG. 5 is a view similar to FIG. 4 but with the fastener rotated 90° in a counterclockwise direction from the position shown in FIG. 3.
Figure 6:
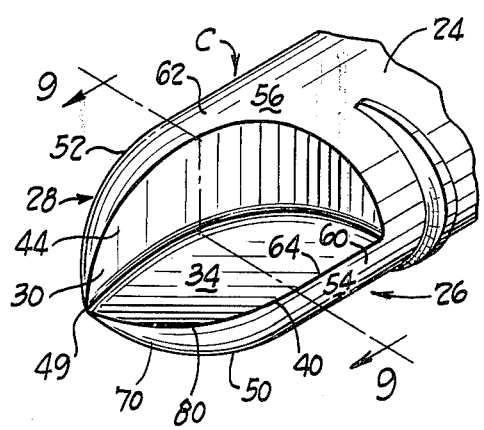
FIG. 6 is a perspective view of the drill end of the fastener shown in FIG. 3 rotated about 45° in a clockwise direction from the position shown in FIG. 5.

One of the principal characteristics of the drill point C is the shape of the generally paraboloidal section 28 thereof which when viewed in elevation, see FIGS. 4 and 5 of the drawings, is that of a parabola. This shape produces a strong material cutting point having optimum cutting edges. The clearance for the cutting edges has been exaggerated in the drawings for purposes of illustration. It will, however, be obvious that different desired clearances can be obtained by offsetting the axes $f$, $g$ different amounts transversely of the axis $b$ and/or transversely of the axis $c$.

A further principal feature of the drill point C is the form and location of the arcuate trailing sides 44, 46 of the flutes 30, 32. As previously indicated the tips of the sides 44, 46 are substantially in the diametrical plane C but they undercut or recede from the plain in the direction in which the fasteners is rotated during driving through substantially the entire length of the section 28 of the drill point thus producing a hook-like configuration at the lower ends thereof. The surfaces 44, 46 are also bevelled outwardly throughout most of their lengths. The constructions just mentioned decreases the width of the surfaces 74, 76 of the quadrants 50, 52 adjacent the end 49 of the fastener thus increasing the efficiency of the cutting action and preventing or reducing the tendency of the point of the fastener to "walk" or "skitter" when it is first rotated against the surface into which it is to be driven.

The diameter of the hole drilled by the fastener will be equal to the maximum distance that the cutting edges 40, 42 at the drill point are apart. This will normally occur at or adjacent the end of the drill point nearest the head of the fastener. The generally cylindrical section 26 of the drill point may taper slightly so as to ream the hole drilled by the generally paraboloidal section 28 to a predetermined size, which size will be a function of the size of the screw, the form of the thread thereon and the character of the material with which the fastener is designed to be used. Generally the size of the hole produced by the drill point will be such that when the thread is formed in the material in which the screw is driven there will be no void along the threads. In some instances, however, where the major loading of the fastener is in shear the thread in the material in which the fastener is driven may be of less depth than the height of the thread on the fastener. This facilitates driving of the fastener.

Figure 10:
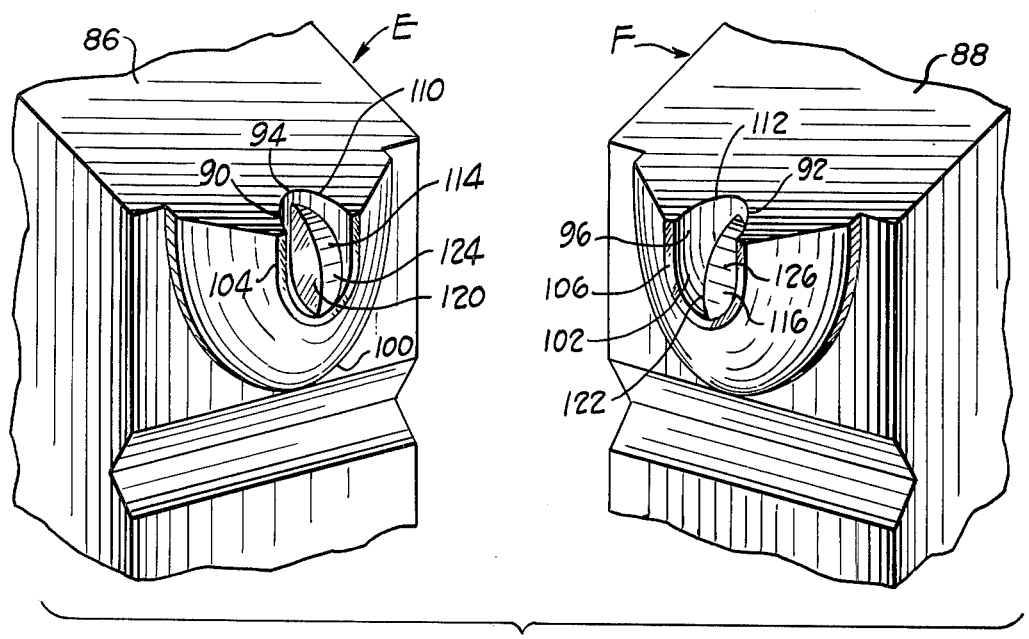
FIG. 10 is a prospective view of the pair of dies employed in making the screw blank shown in FIG. 2.

The drill point C of the fastener A is formed by complementary identical forging dies E, F (FIG. 10) mounted in directly opposed relationship in conventional forging apparatus and reciprocated thereby between an open position and a fully closed position. The dies E, F have planar top surfaces 86, 88, and identical cavities 90, 92 including upper portions 94, 96 as viewed in the drawings, having the general form of a partial sector or half segment of a circle to produce one of the generally cylindrical portions 54, 56 of the quadrants 50, 52 of the drill point C and lower portions 100, 102 each having the general form of a partial section of a paraboloid to produce one of the generally paraboloidal quadrants 70, 72 of the drill point C. The axes of the generally cylindrical portions 94, 96 and of the generally paraboloidal portions 100, 102 are offset along the parting planes or surfaces 104, 106 of the dies in a manner similar to those of the corresponding parts of the drill point such that the distances of the curved walls of the cavities 90, 92 from the axes of the cavities decrease in the direction of the parting surfaces 104, 106, to provide clearance for the cutting edges 40, 42 of the fastener C and form the flash 20 on a non-consequential area of the blank B between the cutting edges of the drill point. In the preferred embodiment the flash is formed along the trailing sides 46, 44 of the quadrants 50, 52 of the drill point and when removed during the thread operation leave lines of torn or jagged points along the trailing sides of the quadrants. The extreme upper ends 110, 112 of the cavities 90, 92, as viewed in the drawings, are slightly bevelled or flared to the diameter of the shank of the fastener to form the part of the fastener which merges the section 26 of the drill point C into the shank of the fastener.

The cavities 90, 92 of the dies E, F each have a protuberance 114, 116 therein defined by flat surfaces 120, 122 normal to the die parting surfaces 104, 106 and arcuate surfaces 124, 126 substantially at right angles to the surfaces 120, 122. The surfaces 120, 124 of the die cavity 90 merge into one another at the lower extremity of the cavity 90 of the die E and the surfaces 122, 126 do likewise in the cavity 92 of the die F. The surfaces 120, 124 of the die cavity 90 in the die E are the surfaces against which the metal of the shank of the blank is pressed during the forging of the drill point to form the flute or slot 30 in the drill point C and the surfaces 122, 126 of the die cavity 92 in the die F form the flute or slot 32. The cavities 90, 92 may be considered as generally semi-cylindrical in shape and bisected by the surfaces 120, 122 of the protubberances 114, 116. The surfaces 124 and 126 are not paralled with the parting surfaces of the dies E, F, respectively, as these surfaces form the surfaces 44, 48 on the exemplary fastener shown in FIGS. 3 to 6 but protrude slightly near their lower ends to form the hook like configuration at the tip 49 of the drill end C and in the areas adjacent the curved walls of the portions 94, 96 of the cavities 90, 92 to form the inward convergence of the surfaces 44, 46 depicted in the drawings, see particularly FIG. 5.

The dies are relieved around the flat parting surfaces 104, 106 in such a manner that they are very narrow so as to produce a weak fracture line at the connection of the flash 20 with the drill point of the fastener thus providing for removal of the flash from the fastener blank during the thread rolling operation. The relief provided about the die cavities also providing any clearance required during the forging operation for portions of the shank of the blank outwardly of the drill point including an end portion, such as, the end part 128 of the blank shown in FIG. 2.

Figure 11:
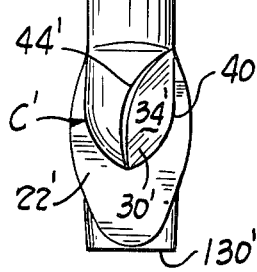
FIG. 11 is an elevational view of a blank similar to the blank shown in FIG. 1 after performance of a die pointing operation thereon in accordance with an alternative embodiment of the invention.

The blank shown in FIG. 11 is identical to the blank shown in FIG. 2 except that the flash produced during the forging of the drill point occurred at the trailing sides or cutting edges of the flutes instead of at the leading or non cutting sides of the flutes, referring to the direction the fastener are rotated during driving and the corresponding parts thereof are designated by the same reference characters as those used in FIGS. 1 to 8 inclusive with a prime mark affixed thereto.

Figure 12:
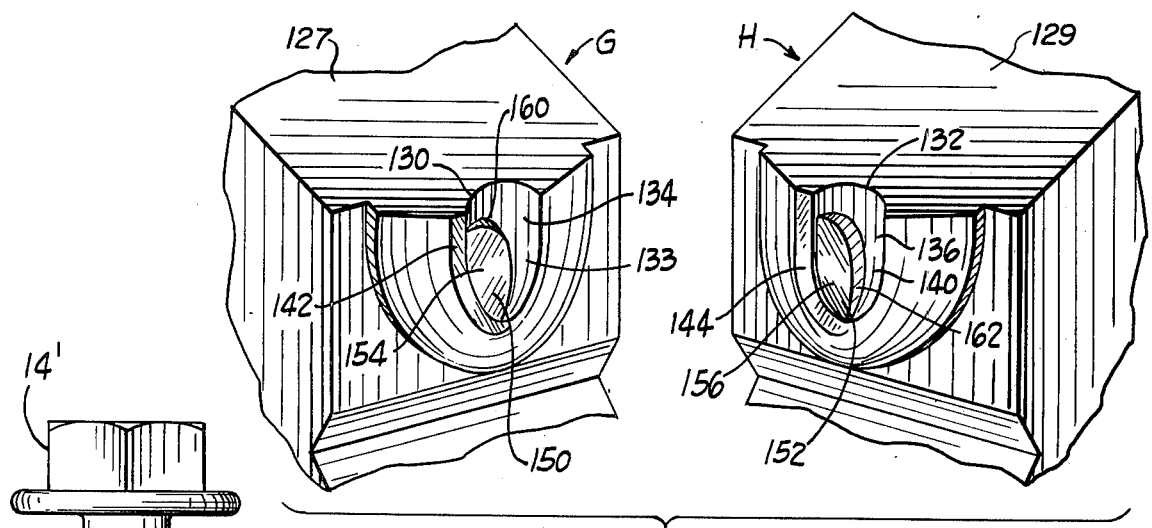
FIG. 12 is a prospective view of the pair of dies employed in making the blank shown in FIG. 11.

The drill point C' of the blank B' and in turn the screw produced therefrom was formed by complementary identical forging dies G, H, (FIG.-12) mounted in directly opposed relationship in conventional forging apparatus and reciprocated thereby between an open position and a fully closed position. The dies G, H, have top planar surfaces 127, 129 and identical cavities 130, 132, therein including upper and lower portions 134, 136 and 138, 140, respectively, a view in the drawings. The portions 134, 136 of the cavities 130, 132 each have the general form of a partial sector half segment of a circle to produce one of the generally cylindrical portions 54', 56' of the quadrants 50', 52' of the drill point C'. The lower portions 138, 140 of the cavities 130, 132 each having the general form of a partial section of a paraboloid to produce one of the generally paraboloidal quadrants 70', 72' of the drill point C'. The axes of the generally cylindrical portions 134, 136 and of the generally paraboloidal portions 138, 140 are offset along the parting planes or surfaces 142, 144 of the dies in a manner similar to those of the corresponding parts of the drill point such that the distances of the curved walls of the cavities 130, 132 from the axes of the cavities increases in the direction of the parting surfaces 142, 144, to provide clearance for the cutting edges of the fastener and form the flash 20' on the blank B' at the cutting edges of the drill point C' which when broken off leaves or produces torn or jaggered cutting edges. The extreme upper ends 146, 148 of the cavities 130, 132, as viewed in the drawings, are slightly bevelled or flared to the diameter of the shank of the fastener to form the part which merges the section 26' into the shank 24'.

The cavities 130, 132 of the dies G, H each have a protuberance 150, 152 therein defined by flat surfaces 154, 156 paralled with the parting surfaces 142, 144 and substantially flush therewith and with arcuate surfaces 160, 162 substantially at right angles to the surfaces 154, 156. The surfaces 154, 160 of the die cavity 130 merge into one another at the lower extremity of the cavity 130 and the surfaces 156, 162 do likewise in the cavity 92. The surfaces 154, 160 of the die cavity 130 and the surfaces 156, 162 of the die cavities 132 are the surfaces against which the metal of the shank of the blank is pressed during the forging of the drill point thereon to form the flute or slot 30', 32' in the drill point C'.

The dies G, H are relieved around the flat parting surfaces 142, 144 in the same manner as the parting surfaces 104, 106 of the dies E, F and will not be described.

The preferred embodiment of fastener shown and described is designed to form threads in the material into which it is inserted or driven by swaging as distinquished from cutting the invention or inventions disclosed herein are applicable to drill and thread forming threaded fasteners which cut the threads formed in the material in which they are inserted or driven. In the case of drill and thread forming threaded fasteners designed to cut threads in the material in which they are driven would preferrably have a maximum drill point diameter equal to the root diameter of the thread of the fastener and the grooves forming the cutting edges would extend axially of the fastener into one or more convolutions of the thread. Alternatively the thread could be extended down onto the generally cylindrical 26 of the drill point. The flutes 30, 32 might also be inclined slightly to provide rake for the cutting edges.

From the foregoing specification it will be apparent that the objects heretofore enumerated and others have been accomplished and that there has been provided a novel and improved drilling and thread forming threaded fastener which can be inexpensively manufactured in various sizes and forms for ready insertion into materials of different character, including hardness, with an optimum driving forces. The pilot or drilling point of the fastener has optimum strength and efficient cutting characteristics. A novel and improved method of, dies and blank for producing the fastener by forging the drill point thereon has also been provided.

While preferred embodiments of the invention have been described in considerable detail the invention is not limited to the preferred constructions disclosed but can be otherwise embodied and it is the intention to hereby cover all adaptations and modifications thereof which come within the practice of those skilled in the art to which the invention relates.

I claim:

1. A drill and thread forming threaded fastener having a roll threaded shank constructed at one end for selective engagement with a driving tool, a forged drill point including jagged flash parts at the other end of said shank, and a pair of diametrically opposed flutes having longitudinally extending generally planar surfaces located substantially in a diametric plane containing the axis of the fastener, said flutes forming in said drill point diametrically opposed quadrants the termini of the leading radial sides of which quadrants referring to the direction the fastener is rotated during driving form cutting edges, the improvement wherein said flash parts are spaced circumferentially from said cutting edges.

2. A drill and thread forming threaded fastener having a roll threaded shank constructed at one end for selective engagement with a driving tool, a forged drill point including jagged flash parts at the other end of said shank comprising a generally cylindrical section adjacent to said threaded shank and a generally paraboloidal section at the end of said generally cylindrical section opposite to said threaded shank, and a pair of diametrically opposed flutes having longitudinally extending generally planar surfaces located substantially in a diametric plane containing the axis of the fastener, said flutes forming in said drill point diametrically opposed quadrants the curved surfaces of which for the generally cylindrical section of the drill point are partial sectors or approximately one-half segments of cylinders and for the generally paraboloidal section are partial segments of paraboloids, the termini of the leading radial sides of which quadrants referring to the direction the fastener is rotated during driving form cutting edges, the improvement wherein said flash parts are spaced circumferentially from said cutting edges, the axes of said cylinders and paraboloids being offset from the axis of the fastener to provide clearance for said cutting edges.

* * * * *